(12) United States Patent
Suzuki

(10) Patent No.: US 8,780,403 B2
(45) Date of Patent: Jul. 15, 2014

(54) IMAGE FORMING APPARATUS, CONTROL METHOD, AND STORAGE MEDIUM

(75) Inventor: Ryousuke Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1020 days.

(21) Appl. No.: 12/482,709

(22) Filed: Jun. 11, 2009

(65) Prior Publication Data

US 2009/0310184 A1    Dec. 17, 2009

(30) Foreign Application Priority Data

Jun. 16, 2008    (JP) .................................. 2008-156899

(51) Int. Cl.
*G06K 15/00* (2006.01)
(52) U.S. Cl.
USPC ............ 358/1.18; 358/1.2; 358/1.9; 358/474; 358/500; 358/3.23; 382/112; 382/282
(58) Field of Classification Search
None
See application file for complete search history.

(56) References Cited

U.S. PATENT DOCUMENTS

| 6,289,121 B1 * | 9/2001 | Abe et al. ...................... 382/175 |
| 2005/0078993 A1 * | 4/2005 | Oomura et al. ............... 399/366 |
| 2005/0190411 A1 * | 9/2005 | Ohno .......................... 358/3.28 |

FOREIGN PATENT DOCUMENTS

| JP | 2000-318230 A | 11/2000 |
| JP | 2001-197297 A | 7/2001 |
| JP | 2001-238075 A | 8/2001 |
| JP | 2008098943 A | 4/2008 |

* cited by examiner

*Primary Examiner* — Ashish K Thomas
(74) *Attorney, Agent, or Firm* — Canon USA Inc IP Division

(57) ABSTRACT

An image forming apparatus specifies as a blank area an area where a drawing object different from a latent image and a copy-forgery-inhibited pattern background image is removed from a copy-forgery-inhibited pattern image in a first page when printing is instructed, and lays out a drawing object of a second page in the specified blank area.

12 Claims, 23 Drawing Sheets

FIG.10
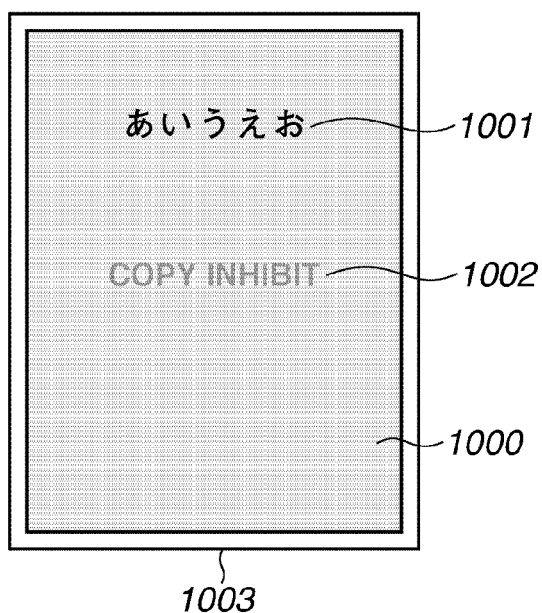
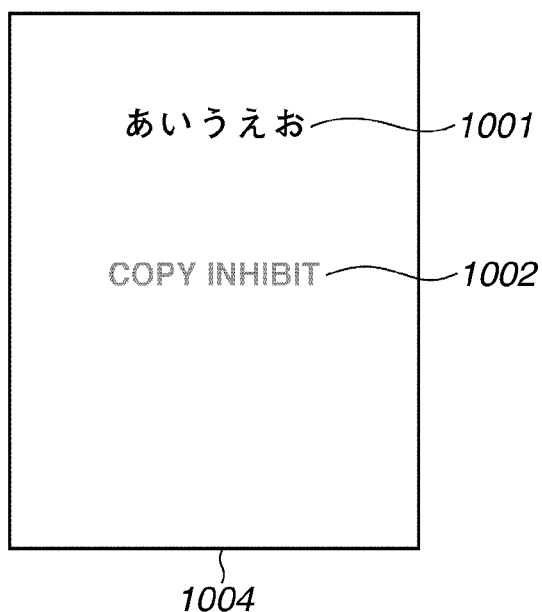

FIG.19
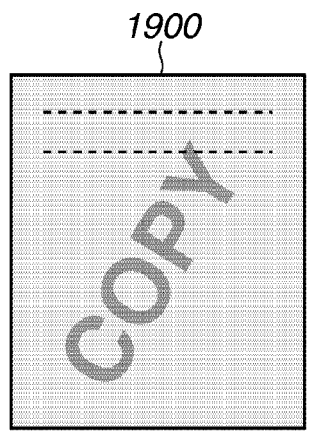
1900
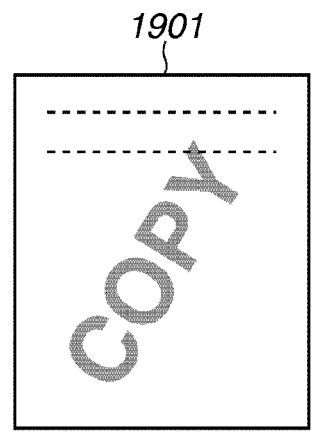
1901
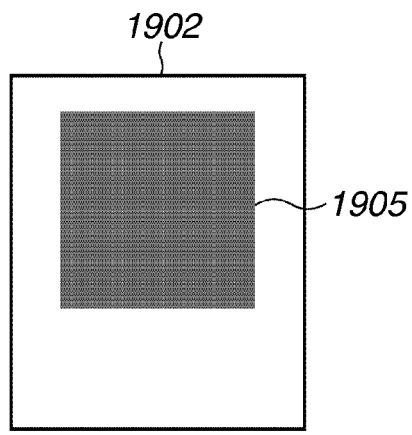
1902
1905
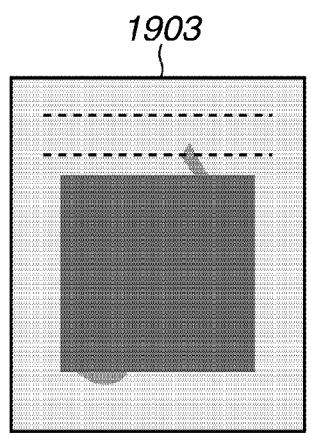
1903
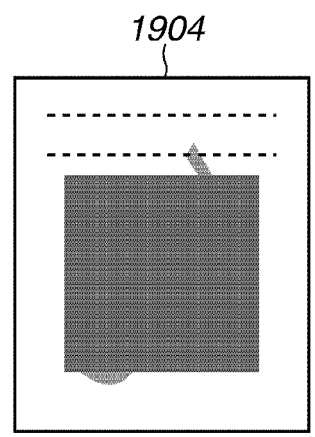
1904

IMAGE FORMING APPARATUS, CONTROL METHOD, AND STORAGE MEDIUM

BACKGROUND OF THE INVENTION

1. Field of the Invention

The present invention relates to a page layout technique for rearranging a drawing object such as a figure or a character string contained in document data that has been laid out.

2. Description of the Related Art

Techniques to suppress copying of a document that is required to guarantee authenticity are discussed in Japanese Patent Application Laid-Open No. 2001-197297 and Japanese Patent Application Laid-Open No. 2001-238075. In the techniques discussed in the Laid-Open No. 2001-197297 and the Laid-Open No. 2001-238075, when document data created with a computer is output in paper, an image called a copy-forgery-inhibited pattern is superimposed on the document data and output. When such a print document with the copy-forgery-inhibited pattern attached thereto is copied, a copy product on which a latent image remains and a copy-forgery-inhibited pattern background image is lost can be obtained.

The copy-forgery-inhibited pattern includes large dots (concentrated dots) that can be detected by an image scanner and small dots (dispersed dots) that cannot be detected by the image scanner. Hereinafter, an image that is formed of the large dots and remains (is reproduced) after copying a print product, is referred to as a latent image. An image that is formed of the small dots that disappear (is not reproduced) after copying the print product, is referred to as a copy-forgery-inhibited pattern background image. Further, an area that includes a latent image (latent image area) and a copy-forgery-inhibited pattern background image (copy-forgery-inhibited pattern background area) is referred to as a copy-forgery-inhibited pattern image (copy-forgery-inhibited pattern area).

Meanwhile, a technique to save the number of output sheets by closing up blank areas in a page is discussed in Japanese Patent Application Laid-Open No. 2000-318230.

In FIG. 10, a page 1003 is a print product on which a copy-forgery-inhibited pattern image is attached. A drawing object 1001 is, for example, a character that is not related to the copy-forgery-inhibited pattern image. In the drawing, reference numeral 1002 denotes a latent image and reference numeral 1000 denotes a copy-forgery-inhibited pattern background image. When the print product of the page 1003 is copied, a copy product 1004 is formed. On the copy product 1004, the drawing object 1001 and the latent image 1002 remain. However, the copy-forgery-inhibited pattern background image 1000 is lost. As described above, on the print product of the document data on which the copy-forgery-inhibited pattern is attached, the relationship between the drawing object such as the image and the character that is not related to the copy-forgery-inhibited pattern image, and the drawing object that forms the copy-forgery-inhibited pattern area is similar to a relationship between a front object and a background object. Accordingly, it is in effect possible to regard the copy-forgery-inhibited pattern area as a blank area. However, in the known techniques, an area where no object exists is regarded as the blank area. More specifically, in the copy-forgery-inhibited pattern image area that can be in effect considered as the blank area, a latent image area and a drawing object for forming a copy-forgery-inhibited pattern background image are contained. Accordingly, it has not been possible to recognize the above-described copy-forgery-inhibited pattern area as the blank area.

For example, in Japanese Patent Application Laid-Open No. 2000-318230, a line on which no object is laid out is specified as a blank line. By deleting the blank line and re-laying out an object in a succeeding page, the number of sheets is reduced. More specifically, in the technique discussed in Japanese Patent Application Laid-Open No. 2000-318230, the copy-forgery-inhibited pattern area that can be in effect regarded as a blank area is not considered the blank area. Accordingly, the number of sheets may not be saved.

SUMMARY OF THE INVENTION

According to an aspect of the present invention, an image forming apparatus that stores a first page containing a copy-forgery-inhibited pattern image having a copy-forgery-inhibited pattern background image that is lost by coping a print product, and a latent image that remains after copying the print product, and a second page containing at least a drawing object is provided. The image forming apparatus includes an instruction unit configured to issue an instruction to print the first page and the second page, a specification unit configured to specify as a blank area an area where a drawing object different from the latent image and the copy-forgery-inhibited pattern background image is removed from the copy-forgery-inhibited pattern image in the first page when the printing is instructed by the instruction unit, and a layout unit configured to lay out the drawing object of the second page in the blank area specified by the specification unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 10 illustrates a problem in a known technique.

FIG. 19 illustrates a problem in layout according to the exemplary embodiment of the present invention.

DETAILED DESCRIPTION OF THE EMBODIMENTS

Figure 4:
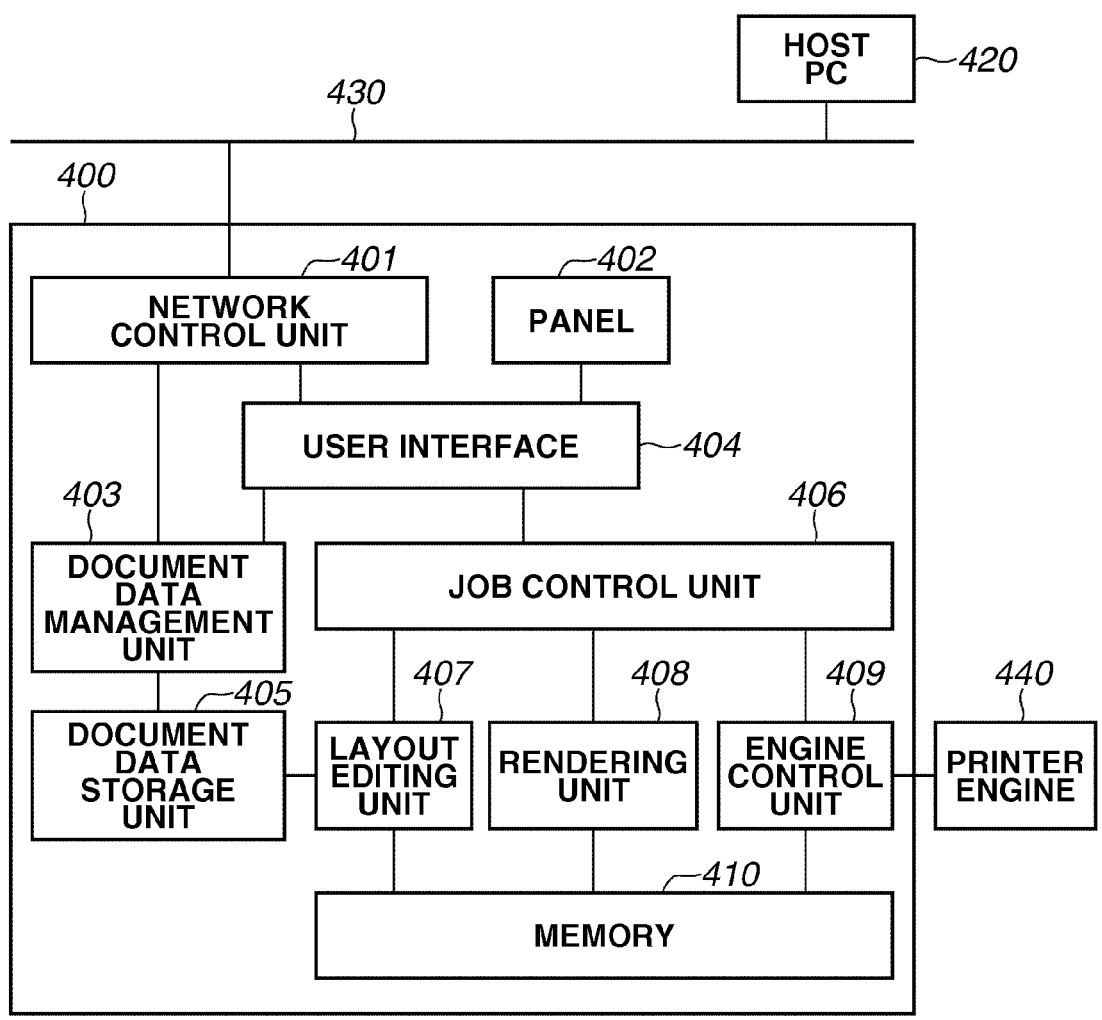
FIG. 4 illustrates an example of a print control system that performs layout processing according to the exemplary embodiment of the present invention.

FIG. 4 is a system configuration diagram illustrating an example of a configuration of a print control system according to an exemplary embodiment of the present invention. A print controller 400 is connected to a host personal computer (PC) 420 via a network 430. The printer controller 400 is also connected to a printer engine 440.

An internal configuration of the printer controller 400 is described. A network control unit 401 receives various data sent from the network 430. A user interface 404 is connected to the host PC 420 and a panel 402 provided in the printer controller. The user interface 404 receives input from a user. A document data management unit 403 is connected to the network control unit 401. The document data management unit 403 receives document data sent from the host PC 420, and stores the data in a document data storage unit 405. The document data management unit 403 is also connected to the user interface 404, and sends information about the document data stored in the document data storage unit 405 to the user interface 404. A job control unit 406 controls a print job according to an instruction from the user interface 404. A job control unit 406 is connected to a layout editing unit 407, a rendering unit 408, and an engine control unit 409, and controls operation of these units.

The layout editing unit 407 reads the document data stored in the document data storage unit 405 by a method described below and performs relayout processing of the document data. The document data that was subjected to the relayout processing is stored in a memory 410.

The rendering unit 408 interprets the document data stored in the memory 410, and converts the data into bitmap data to be printed on a sheet. The bitmap data generated by the rendering unit 408 is stored in the memory 410. The engine control unit 409 reads the bitmap data stored in the memory 410 and sends the data to the printer engine 440. The printer engine 440 prints the received bitmap data on the sheet. The printer controller 400 and the printer engine 440 may be disposed in the same case or may be disposed in different cases. This case is referred to as an image forming apparatus. In the exemplary embodiment, operation of the printer controller 400 is classified roughly into three types of operation.

That is, 1. Registration of Document Data, 2. Relayout of Document Data, and 3. Print of Document Data. Hereinafter, the respective operations are described as follows.

The document data is generated by a printer driver that operates on the host PC 420.

The printer driver receives an instruction whether to attach a copy-forgery-inhibited pattern image to the document data, from a user when the document data is generated. When the copy-forgery-inhibited pattern image is attached to the document data, the printer driver adds to the document data a drawing object including the copy-forgery-inhibited pattern image that contains a latent image that appears (remains) after copying a print product and a background image that does not appear (not remain) after the copying. The drawing object including the copy-forgery-inhibited pattern image may be described in a bitmap format or a vector format. Alternatively, an identifier of a copy-forgery-inhibited pattern that is defined in the printer controller 400 in advance may be attached. As described above, the document data generated by the printer driver is sent to the printer controller 400 via the network 430.

Figure 2:
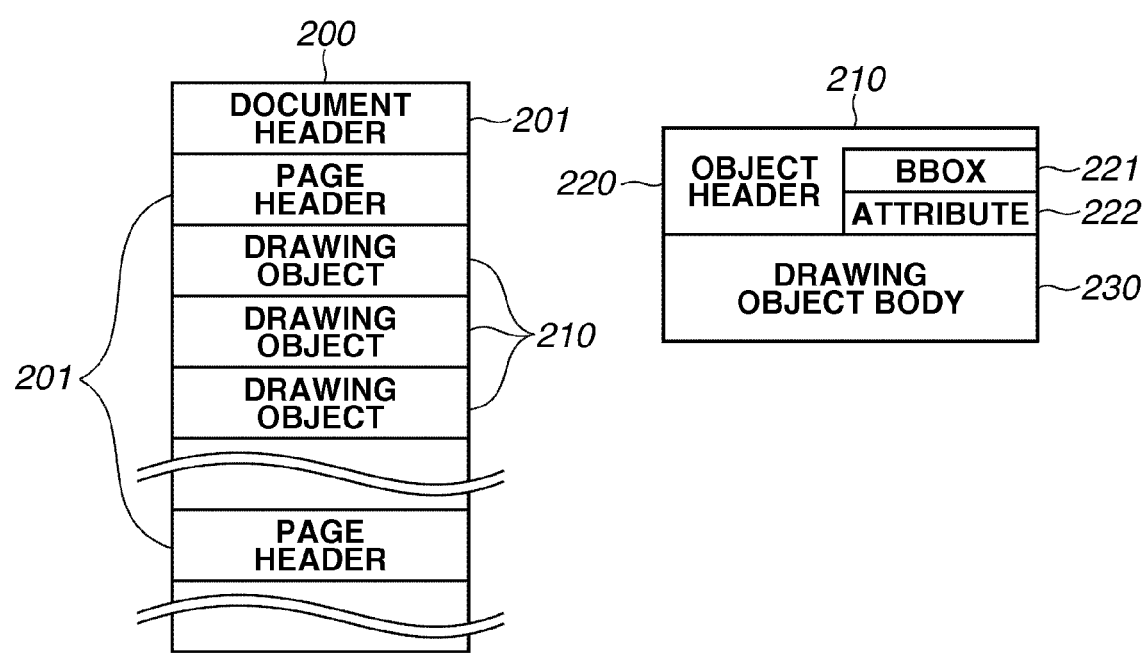
FIG. 2 illustrates an example of a document data structure.

The document data is received in the network control unit 401. The network 401 sends the received document data to the document data management unit 403. The document data management unit 403 converts the received document data into an internal format that can be interpreted by the layout editing unit 407 and stores the data in the document data storage unit 405. An example of the above-described internal format stored in the document data storage unit 405 is illustrated in FIG. 2. Document data 200 includes one document header 201, a plurality of page headers 201, and a drawing object 210. In the document header 201, an attribute relating to the entire document and a list of the page headers contained in the document data are stored. In the page header 201, an attribute of the page and a list of drawing objects contained in the page are stored.

The drawing object 210 further includes an object header 220 and a drawing object body 230. In the drawing object header 220, bounding box information 221 that indicates a location in the page where a drawing object is drawn and a drawing object attribute 222 are stored. To the drawing object attribute 222, a flag indicating that the drawing object is a copy-forgery-inhibited pattern image, and identification information indicating contents of the copy-forgery-inhibited pattern image are set. In the exemplary embodiment, when the printer driver generates a drawing object relating to the copy-forgery-inhibited pattern image, the drawing object attribute 222 is set to the drawing object. The specification concerning the copy-forgery-inhibited pattern image printing is not limited to the printer driver, but the specification may also be made by application.

As described above, the document data stored in the document data storage unit 405 is registered in a document data list in the document data management unit 403.

An operation performed when the document data stored in the document data storage unit 405 is printed is described with reference to a flowchart in FIG. 5. Each step in the flowchart according to the exemplary embodiment of the present invention is implemented by a central processing unit (CPU) 2312 of the printer controller.

In step S501, the user interface 404 displays a document data list registered in the document data management unit 403 on the panel 402 or the host PC 420. The host PC 420 or the panel 402 can select a plurality of documents as documents to be printed. In step S502, the user interface 404 receives the document data to be printed.

In step S503, the user interface 404 receives the selected document layout method according to an instruction input via the host PC 420 or the panel 402. The layout method that can be selected via the host PC 420 or the panel 402 includes known methods of the Nup layout method and layout methods such as enlargement and reduction. In the exemplary embodiment, in addition to the above-described methods, a sheet reduction layout can be selected. In the sheet reduction layout, when a blank area exists in a page, relayout of an object in a succeeding page is performed such that the object in a succeeding page is laid out in the blank area to reduce the number of sheets and implement the sheet reduction. For example, when a large blank area exists on a first page and it is possible to place an object in a second page in the blank area, the object in the second page is laid out in the blank area in the first page to reduce the number of sheets.

In step S504, the layout editing unit 407 performs relayout processing using the document data notified in step S502 and the layout method notified in step S503.

Next, a case where the layout method notified in step S503 is the sheet reduction layout method, is described in detail.

Figure 1:
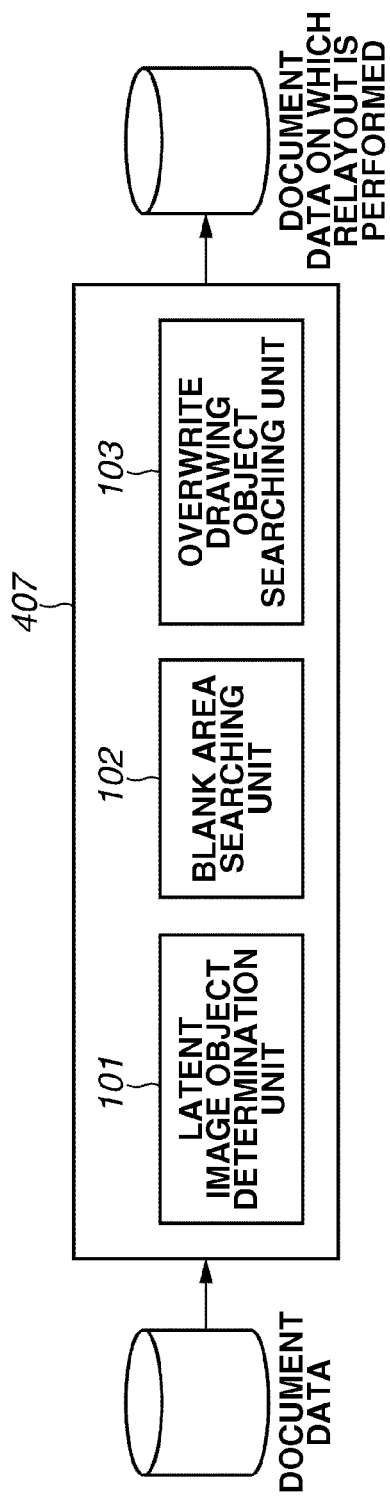
FIG. 1 is a block diagram illustrating a configuration of a layout editing unit that performs layout according to an exemplary embodiment of the present invention.

FIG. 1 is a block diagram illustrating a configuration of the layout editing unit 407 that implements the sheet reduction layout. The layout editing unit 407 includes a latent image object determination unit 101, a blank area searching unit 102, and an overwrite drawing object searching unit 103.

The latent image object determination unit 101 determines whether a drawing object contained in document data is a drawing object relating to a copy-forgery-inhibited pattern image. The latent image object determination unit 101 determines whether each drawing object is the drawing object relating to the copy-forgery-inhibited pattern image by checking the drawing object attribute 222 in FIG. 2.

The blank area searching unit 102 searches for a blank area contained in a page. The operation of the blank area searching unit 102 is described below.

The overwrite drawing object searching unit 103 searches for a drawing object to overwrite in the blank area found by the blank area searching unit 102. The operation of the overwrite drawing object searching unit 103 is described below.

Operation of the layout editing unit 407 performed when a sheet reduction layout is specified, is described with reference to a flowchart in FIG. 11.

In step S1101, the layout editing unit 407 reads the page information contained in document data that is to be edited, from the document data storage unit 405 or the memory 410 from a first page.

In step S1102, the blank area searching unit 102 searches for a blank area in the page read in step S1101. The operation in step S1102 will be described in detail below with reference to FIG. 6.

In step S1104, the overwrite drawing object searching unit 103 searches for a drawing object to overwrite in the blank area found in step S1102. The operation in step S1104 will be described in detail below with reference to FIG. 8. In step S1104, the overwrite drawing object searching unit 103 searches for the drawing object to overwrite while determining whether the drawing object can be laid out in the blank area. Accordingly, the overwrite drawing object searching unit 103 is a first determination unit.

If the drawing object to overwrite is found in step S1104 (YES in step S1104), then in step S1105, the layout editing unit 407 lays out the drawing object found in step S1104 in the blank area found in step S1102 in the page being processed. Then, the processing returns to step S1102.

The above-described processing is repeated until no drawing object to overwrite is found. When the drawing object is not found in step S1104, in step S1103, the layout editing unit 407 ends the relayout processing of the page read in step S1101, and store the laid-out page data in the memory 410. The page data is data of one page contained in the document data that can be interpreted by the rendering unit 408 and converted into bitmaps of one sheet.

Figure 6:
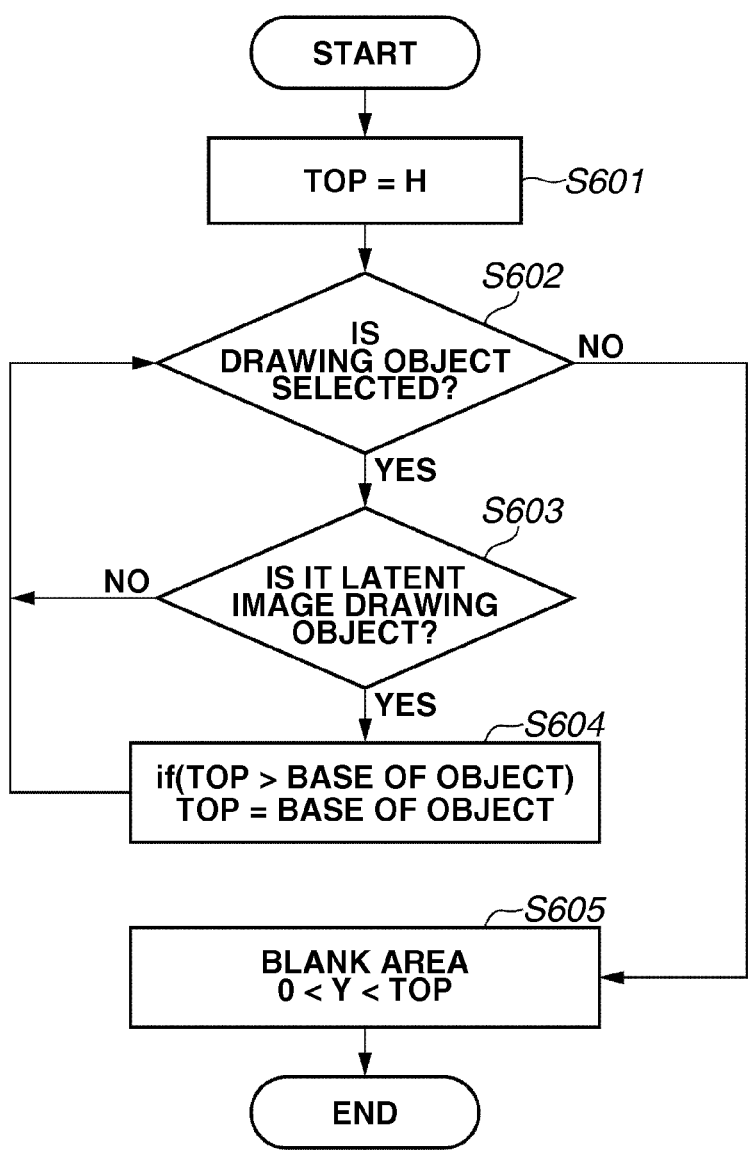
FIG. 6 is a flowchart illustrating operation of a blank area searching unit.

The operation of the blank area searching unit 102 in step S1102 is described with reference to the flowchart in FIG. 6. The blank area searching unit 102, before the processing in FIG. 6 is started, determines whether attachment of the copy-forgery-inhibited pattern image to the page read in step S1101 is specified. If it is determined that the attachment of the copy-forgery-inhibited pattern image is specified, the processing in step S601 is started. On the other hand, If it is determined that the attachment of the copy-forgery-inhibited pattern image is not specified, the blank area searching unit 102 searches for a blank area where a drawing object is not laid out.

In step S601, the blank area searching unit 102 initializes a variable TOP by a height H of the page read in step S1101. The height of the page to be generated is contained in the page header 201 in FIG. 2.

In step S602, the latent image object determination unit 101 selects one drawing object from the page list contained in the target page described in the page header 201 in FIG. 2.

In step S603, the latent image object determination unit 101 determines whether the drawing object selected in step S602 is the drawing object relating to the copy-forgery-inhibited pattern image. The latent image object determination unit 101 performs the determination processing in step S603 based on the flag set to the drawing object attribute 222 in FIG. 2.

If it is determined that the selected object is the drawing object relating to the copy-forgery-inhibited pattern image (NO in step S603), the processing returns to step S602. Then, the latent image object determination unit 101 selects a remaining drawing object.

If it is determined that the selected object is not the drawing object relating to the copy-forgery-inhibited pattern image (YES in step S603), the blank area searching unit 102 refers to the bounding box 221 described in the drawing object header of the selected drawing object.

In step S604, the blank area searching unit 102 compares the value of the variable TOP with a coordinate of a base of the drawing object determined that it is not the drawing object relating to the copy-forgery-inhibited pattern image in step S603. When the value of the variable TOP has a value farther from the base than the base coordinate of the drawing object, the coordinate of the base of the drawing object is set to the selected variable TOP.

The above-described processing is repeatedly performed on all objects contained in the page. When the above-described processing is performed on the all drawing objects, in step S605, the blank area searching unit 102 searches for a blank area from a lowest part of the page to the variable TOP.

An example of the processing in FIG. 6 is specifically described in detail with reference to a page 700 (defined as a first page) in FIG. 7.

The page 700 includes a drawing object 701 that relates to the copy-forgery-inhibited pattern image and drawing objects 702 and 703 that are not related to the copy-forgery-inhibited pattern image. The drawing object 701 includes a latent image and a copy-forgery-inhibited pattern background image.

A height of the page 700 is 100. Accordingly, in step S601, as the initial value of the variable TOP, 100 is set.

In step S602, the drawing object 701 is selected. The drawing object 701 is the object relating to the copy-forgeryinhibited pattern image. Accordingly, the value of the variable TOP is not changed and the processing proceeds to the search for a next drawing object.

When the drawing object 702 is selected, since the drawing object 702 is the drawing object not relating to the copy-forgery-inhibited pattern image, in the determination processing in step S603, it is determined as "NO". Then, the processing in step S604 is implemented.

When a value 60 that is a coordinate of a base of a bounding box of the drawing object 702 is compared with the variable TOP=100 set in step S601, the variable TOP=100 is farther from the base. Accordingly, in step S604, the value 60 is set to the variable TOP.

In step S602, when the drawing object 703 is selected, since the drawing object 703 is the drawing object not relating to the copy-forgery-inhibited pattern image, in the determination processing in step S603, it is determined as "NO". Then, the processing in step S604 is implemented.

When a value 40 that is a coordinate of a bounding box of the drawing object 703 is compared with the value 60 that is the current variable TOP, the variable TOP=60 is farther from the base. Accordingly, in step S604, the value 40 is set to the variable TOP.

By the above-described processing, the determination of the all drawing objects laid out in the page 700 is performed. Accordingly, in step S605, the area from the base to the variable TOP=40 (that is, the area from the base to the base of the drawing object 703) is searched for as the blank area.

The operation of the overwrite drawing object searching unit 103 in step S1104 is described with reference to the flowchart in FIG. 8.

Figure 5:
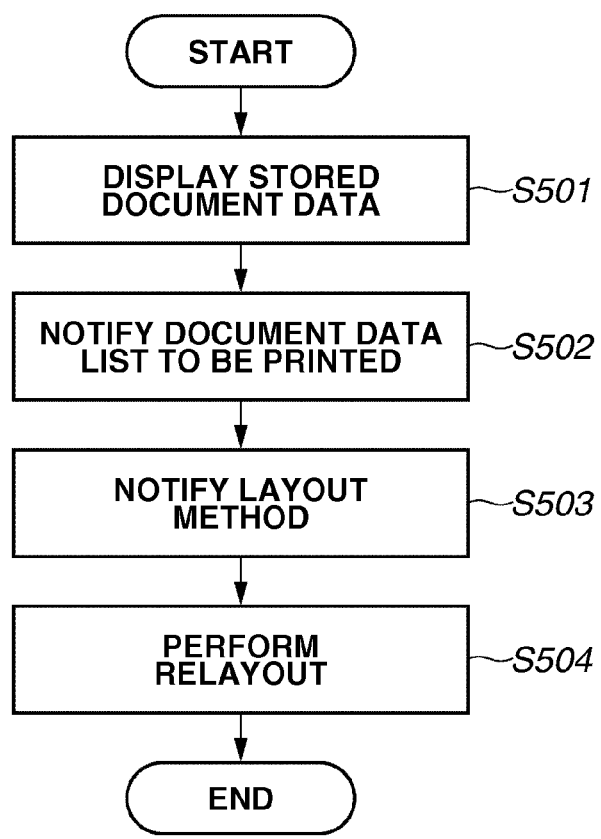
FIG. 5 is a flowchart illustrating operation of layout processing according to the exemplary embodiment of the present invention.

In step S801, the overwrite drawing object searching unit 103 determines whether the next page to a page currently being processed exists in the document data notified in step S502 in FIG. 5. The pages in the document data may be arranged according to the page list read from the document header in FIG. 2. The document data may be arranged according to the order of the document data notified in step S502 in FIG. 5.

In step S802, the overwrite drawing object searching unit 103 searches whether a drawing object relating to the copy-forgery-inhibited pattern image exists in the next page. The processing in step S802 is performed to prevent pages that have different latent images from being combined. For example, by copying a print product of the first page, "COPY OK" that is a latent image remains. Meanwhile, by copying a print product of the second page, "COPY INHIBIT" that is a latent image remains. When the object in the second page is laid out in the first page by implementing the sheet reduction layout in the exemplary embodiment, the object on the second page that is inhibited to be copied may be recognized as an object that is permitted to be copied. To prevent such false recognition, the processing in step S802 is performed. When the next page contains the drawing object relating to the copy-forgery-inhibited pattern image, the search ends.

When it is determined that the drawing object relating to the copy-forgery-inhibited pattern image is not contained in the next page (NO in step S802), in step S803, the overwrite drawing object searching unit 103 determines whether the drawing object in the next page can be separated so as to be laid out within the blank area.

More specifically, it is assumed that a coordinate of an upper side of a drawing object at the uppermost end of the page in the height direction is T. Then, the difference between the value of T and the value of variable TOP set in FIG. 6 is calculated. Between the coordinate of the upper end of the page and a coordinate corresponding to the difference of the value calculated as the difference from the coordinate of the upper end of the page, from among coordinates where no drawing object is laid out, a coordinate nearest to the base of the page in the height direction is searched for. When such a coordinate is not found, the processing in FIG. 8 ends. When the coordinate is found, the processing proceeds to step S804.

In step S803, when it is determined that the drawing object can be separated (YES in step S803), in step S804, the overwrite drawing object searching unit 103 extracts the drawing object that is arranged above the separable border. More specifically, between the coordinate of the upper end of the page and the coordinate calculated as the difference of the variable TOP set in FIG. 6, among the coordinates where no drawing object is arranged, the drawing object arranged above the coordinate nearest to the base of the page in the height direction is extracted.

Figure 7:
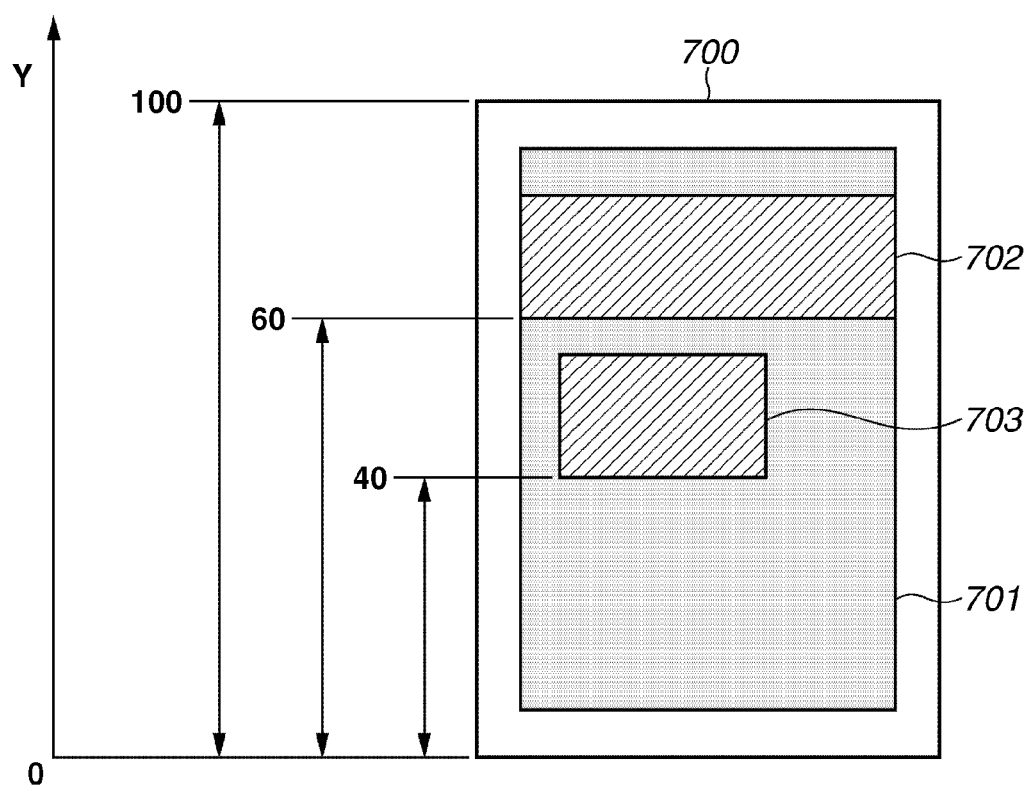
FIG. 7 illustrates the operation of the blank area searching unit.
Figure 8:
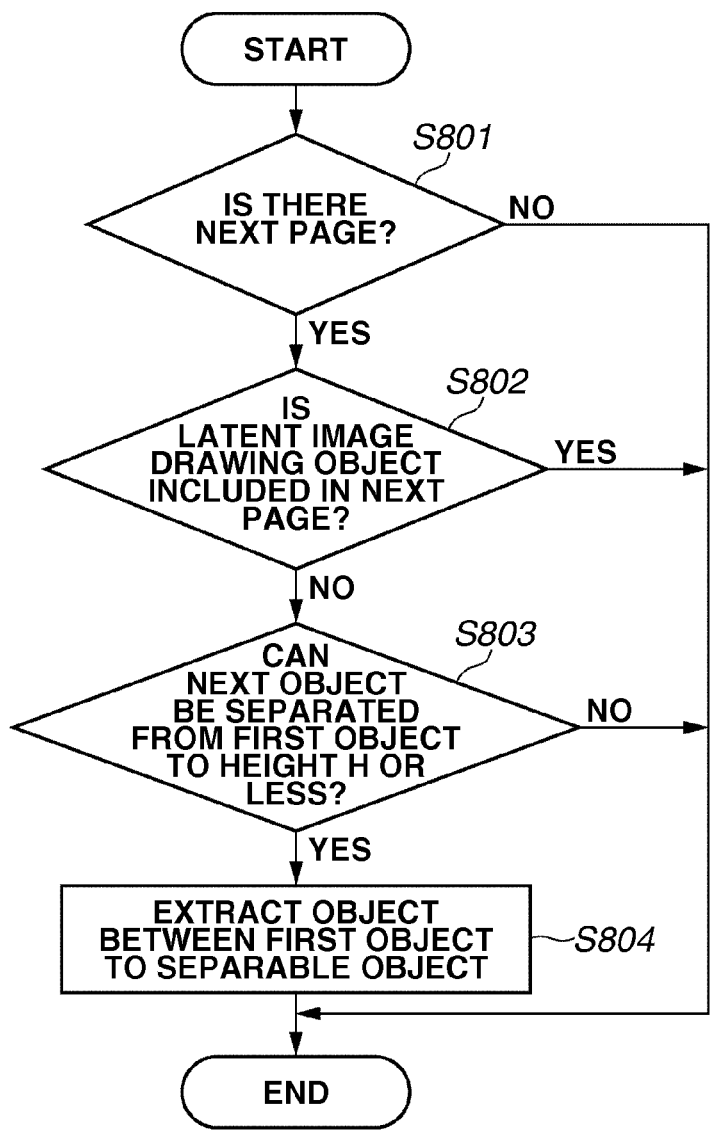
FIG. 8 is a flowchart illustrating an overwrite drawing object searching unit.

Hereinafter, an example of the processing in FIG. 8 is specifically described with reference to FIGS. 7 and 9.

Figure 9:
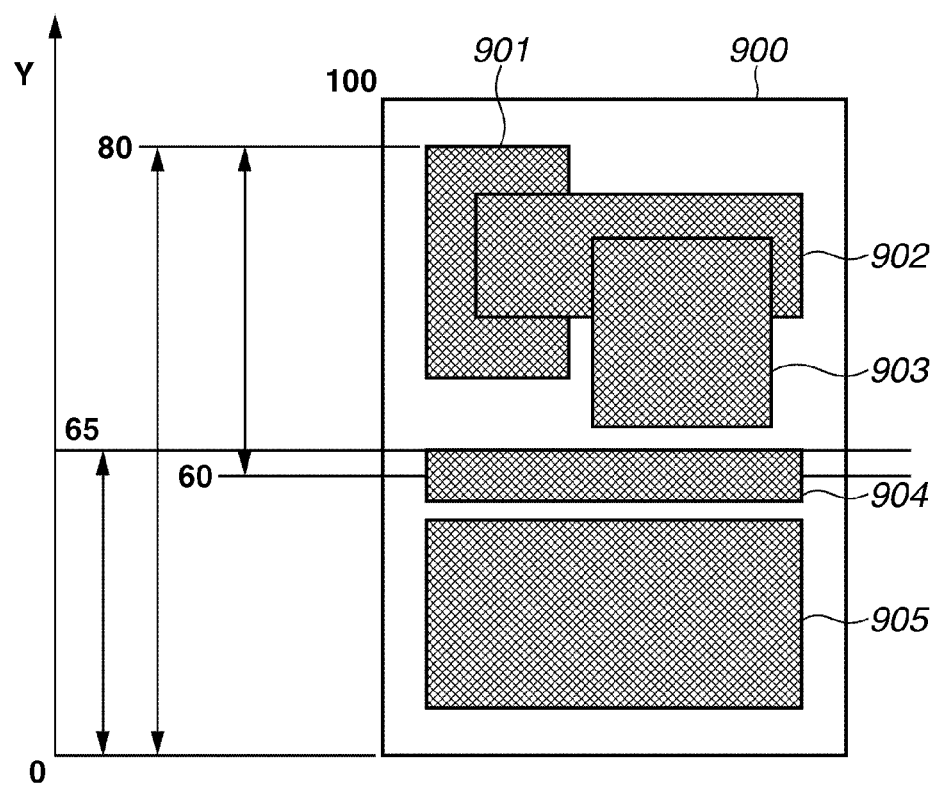
FIG. 9 illustrates the overwrite drawing object searching unit.

A page 900 (it is assumed that the page is a second page) in FIG. 9 is a second page of the page 700 in FIG. 7. In the page 900, any drawing object relating to the copy-forgery-inhibited pattern image is not contained. The page 900 includes the drawing objects 901 to 905.

Since the page 900 does not contain any drawing object relating to the copy-forgery-inhibited pattern image, in step S803, the overwrite drawing object searching unit 103 determines whether the page 900 can be separated.

In FIG. 9, a value 80 that is a coordinate of an upper side of the drawing object 901 at the uppermost end of the page in the height direction is set as the value of T. If the difference between the value 80 of T and the value 40 that is the value of the variable TOP set in FIG. 6 is calculated, a value 40 is obtained. Between the value 100 that is the coordinate of the upper end of the page and the coordinate (=60) corresponding to the position of the value (=40) calculated as the difference, among the coordinates where no drawing object is arranged, a coordinate nearest to the base of the page in the height direction is searched for. As the result, since the coordinate of the upper side of the drawing object 904 is 65, it is determined that it is possible to separate at the upper side of the drawing object 904 (YES in step S803).

Then, the overwrite drawing object searching unit 103 extracts the drawing object 901 to the drawing object 903 that are laid out above a value 65 that is the coordinate of the upper side of the drawing object 904 as the overwrite drawing objects.

Figure 16:
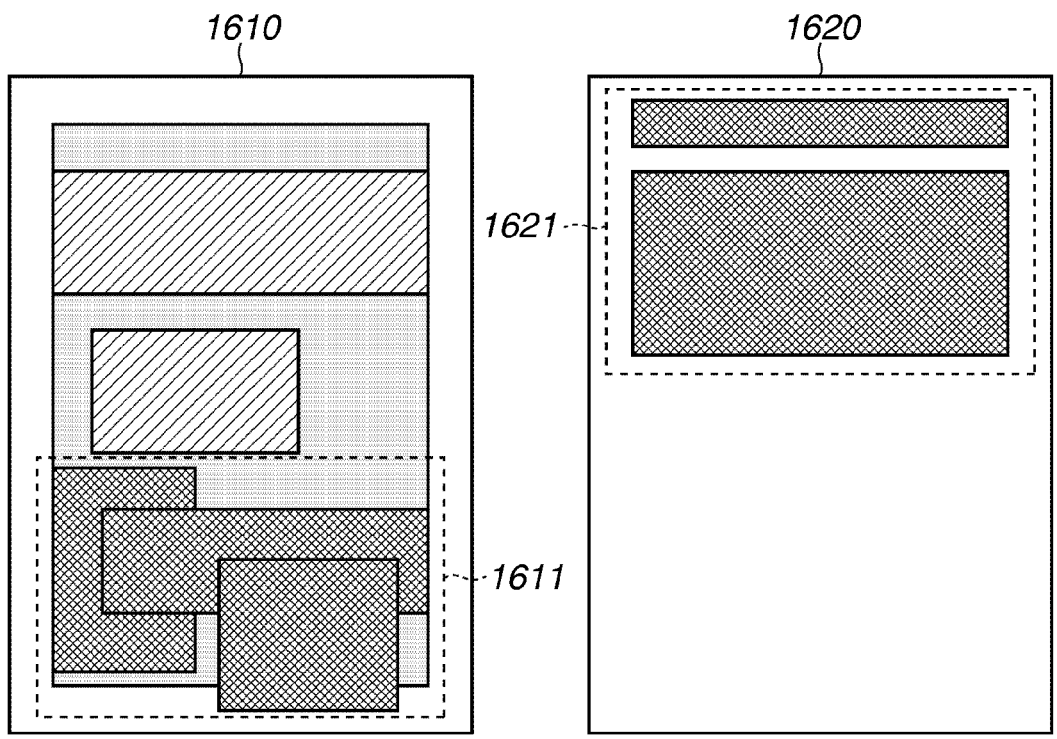
FIG. 16 illustrates an example of results of relayout according to the exemplary embodiment of the present invention.

FIG. 16 illustrates a result the sheet reduction layout according to the exemplary embodiment of the present invention is applied to the document of two pages having the page 700 in FIG. 7 and the page 900 in FIG. 9.

FIG. 16 illustrates the result obtained when the drawing objects 901 to 903 that are found as the overwrite drawing objects out of the drawing objects 901 to 905 in FIG. 9 are laid out in the page 700 that is the previous page.

If the user thinks that it looks better if a small space is provided between the drawing object 703 and the found overwrite drawing object group, the extracted overwrite drawing object group is laid out with a predetermined space from the drawing object 703. The space can be set using the setting screen displayed when the overwrite drawing objects are extracted in step S804 (step S1104).

Alternatively, the drawing objects may be grouped and page data may be configured such that the same affine transformation can be set to the group. In such a case, positions where the drawing objects are actually laid out can be obtained by multiplying a bounding box described in an object header by the grouped affine transformation matrix.

Figure 11:
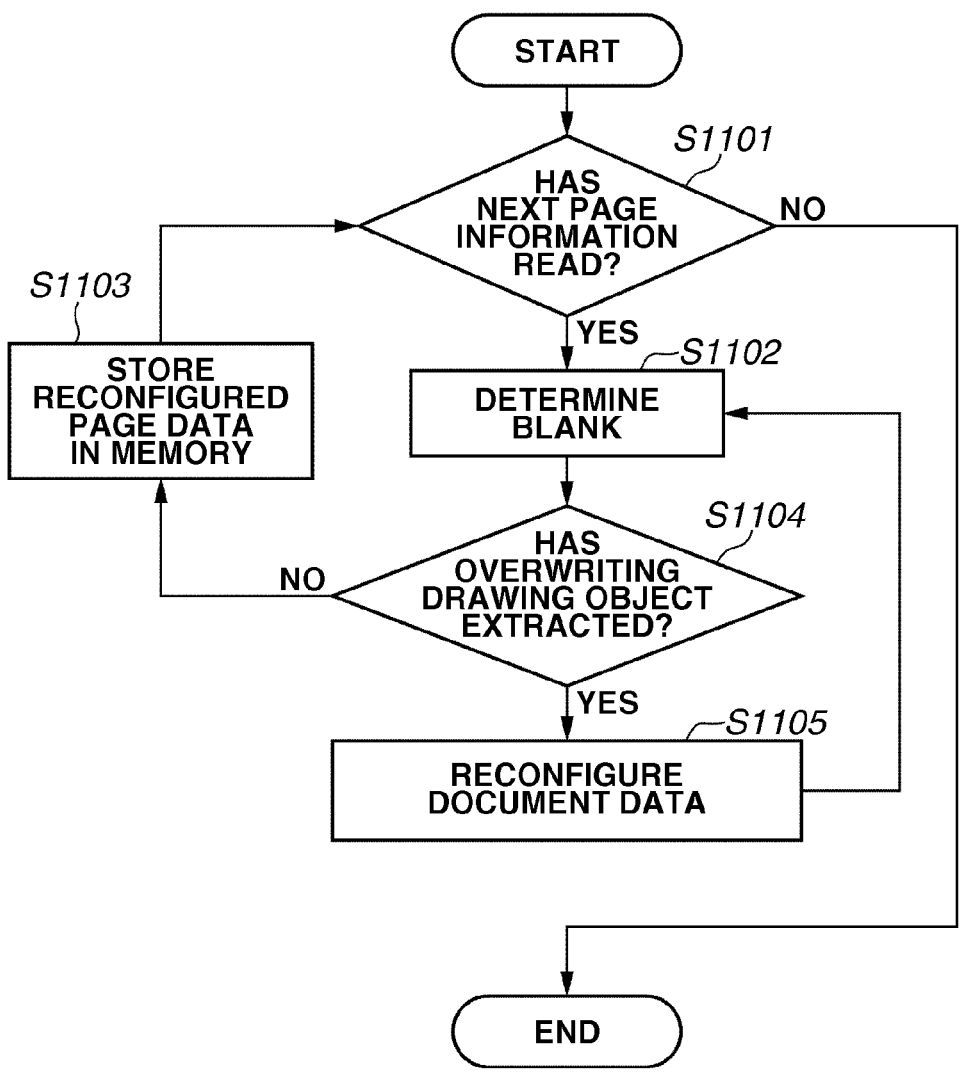
FIG. 11 is a flowchart illustrating operation of a layout editing unit.

Then, the next page information read in step S1101 in FIG. 11 is illustrated with reference numeral 1620. In the figure, the overwrite drawing objects extracted in step S804 (step S1104) are removed, and a position of an object group 1621 that is not extracted is changed.

Figure 12:
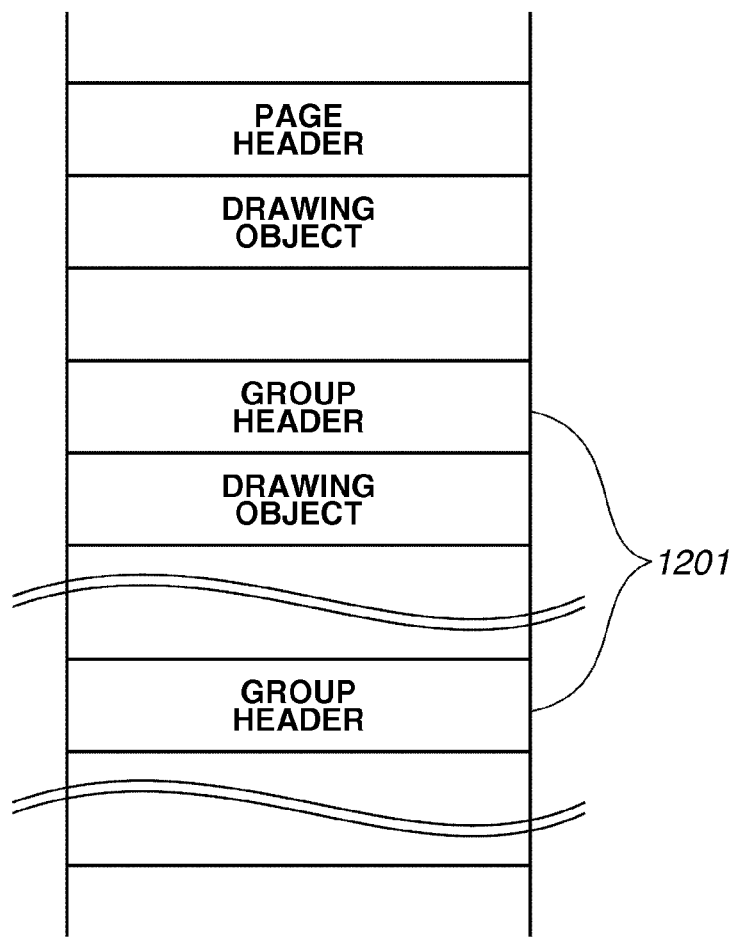
FIG. 12 illustrates an example of page data when drawing objects are grouped.

Page data generated when the drawing objects are grouped is like the data illustrated in FIG. 12. In FIG. 12, a header 1201 is a header of the group of the drawing objects, and stores a list of the objects contained in the group and common attributes of the group.

The page data on which the above-described relayout is performed is converted into bitmaps by the rendering unit 408, and sent to the printer engine 440 by the engine control unit 409.

As described above, by using the sheet reduction layout according to the exemplary embodiment, it is possible to overwrite the area that can be substantially considered as the blank area using the drawing objects of the different page. Accordingly, the relayout of the document data can be performed and printed using the sheets fewer than the original document data. Further, in the exemplary embodiment, the scales of the overwrite drawing objects are not changed. Accordingly, the characters are not blurred, and the number of sheets can be saved.

In the above-described exemplary embodiment, it is configured such that the drawing object relating to the copy-forgery-inhibited pattern image can be identified by the document data input to the printer controller. In a second exemplary embodiment of the present invention, by performing analysis of the drawing object in the printer controller, the drawing object relating to the copy-forgery-inhibited pattern image may be specified.

It is desirable that the determination is performed when the document data is registered in the document data management unit 403. Further, it is desirable that the determination result is described in the drawing object attribute 222 in FIG. 2.

Figure 3:
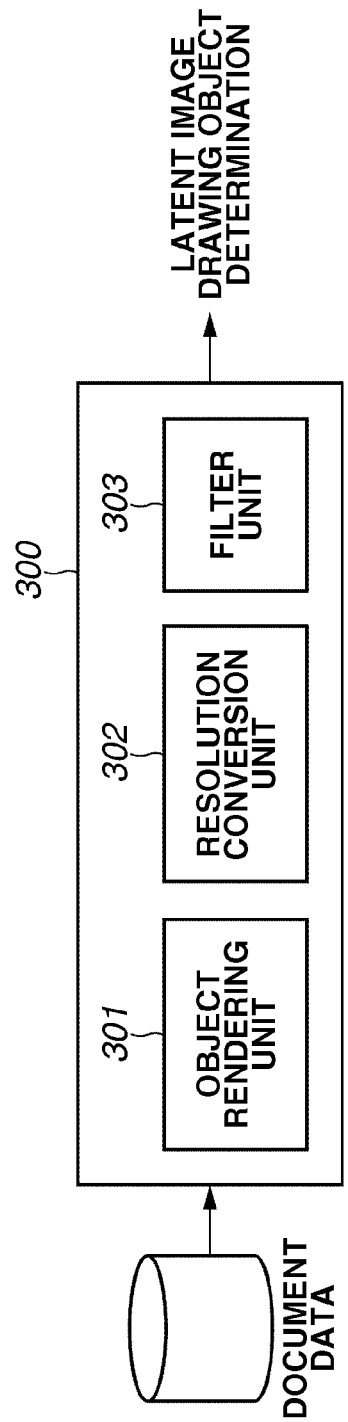
FIG. 3 is a block diagram illustrating a configuration of a latent image drawing object determination unit according to an exemplary embodiment of the present invention.

FIG. 3 illustrates a latent image drawing object determination unit 300 that determines whether a drawing object is relating to the copy-forgery-inhibited pattern image. The latent image drawing object determination unit 300 includes an object rendering unit 301, a resolution conversion unit 302, and a filter unit 303.

The object rendering unit 301 generates bitmap data by performing rendering of a specified drawing object. An attribute necessary to perform the rendering of the drawing object is set to be equal to an attribute in performing rendering of document data that contains the drawing object. It is assumed that the bitmaps obtained by the object rendering unit 301 are binary bitmaps.

The resolution conversion unit 302 converts the binary bitmaps output by the object rendering unit 301 into a resolution that can be read by a common scanner. It is assumed that the resolution of the binary bitmaps is R, and the resolution of the common scanner is S, wherein R is larger than S. In order to convert the binary bitmaps to the low resolution S without losing the information, an information amount per pixel of the converted bitmaps is $(R/S)^2$. For example, when a binary image of 600 dpi is converted into 150 dpi, the information amount per pixel is 4 bits.

The filter unit 303 performs low-pass filtering on each pixel of the multivalued bitmaps output by the resolution conversion unit 302 to replace values of pixels that have densities equal to a predetermined threshold or less with zero and outputs an image.

More specifically, the latent image drawing object determination unit 300 compares the image input in the above-described filter unit 303 with the output image to determine the existence of the drawing object relating to the copy-forgery-inhibited pattern image.

Figure 13:
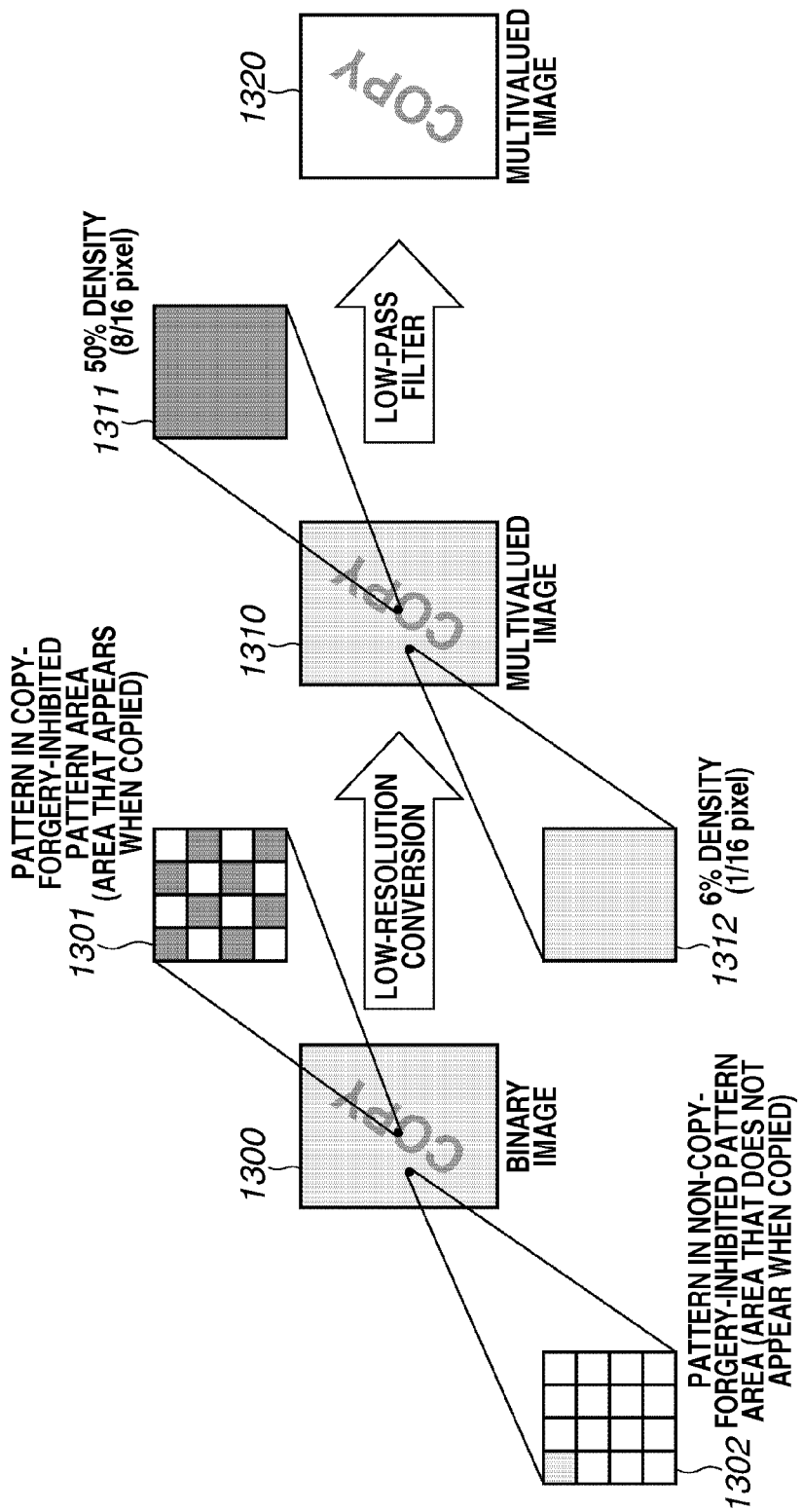
FIG. 13 illustrates operation of a latent image drawing object determination unit.

The operation of the latent image drawing object determination unit 300 is described using a drawing object 1300 in FIG. 13 as an example. The drawing object 1300 is binary bitmaps. The character-shaped area of "copy" is a dot pattern 1301. The other areas are dot patterns 1302. In the original document data, enlargement or reduction is not specified to the drawing object. Therefore, the resolution of the drawing object can be considered the resolution of the bitmaps output by the rendering unit 408. More specifically, the image output by the object rendering unit 301 is the drawing object itself illustrated as the drawing object 1300.

The multivalued image 1310 is generated by the resolution conversion unit 302. In the second exemplary embodiment, it is assumed that the resolution of the drawing object is 600 dpi, and the resolution of the converted bitmaps is 150 dpi. Accordingly, the value of the density of pixels 1311 contained in the character-shaped area of "COPY" is 50%. The value of the density of the other pixels 1312 is 6.25%. A multivalued image 1320 is generated by the filter unit 303. In the second exemplary embodiment, a low-pass filter that cuts densities of 10% or less is used.

Finally, by comparing the multivalued image 1310 with the multivalued image 1320, the latent image drawing object determination unit 300 determines whether the drawing object relating to the copy-forgery-inhibited pattern image is contained.

The latent image drawing object determination unit 300 determines that the drawing object relating to the copy-forgery-inhibited pattern image is contained, for example, when the number of pixels that have different values between the multivalued image 1310 and the multivalued image 1320 is equal to a threshold or more.

As described above, by providing the latent image drawing object determination unit, for example, even if document data of a format that cannot attach an attribute to each drawing object is sent, the determination by the latent image drawing object determination unit 300 can be performed.

In the above-described exemplary embodiments, the overwrite drawing object searching unit 103 can perform the sheet reduction layout according to the exemplary embodiments only when a drawing object relating to a copy-forgery-inhibited pattern image is not contained in a next page. However, if a succeeding page has the same copy-forgery-inhibited pattern, a drawing object in the succeeding page may be moved to the previous page without problems. Accordingly, in a third exemplary embodiment of the present invention, processing performed by the overwrite drawing object searching unit 103 that searches for an overwrite drawing object and performs the sheet reduction layout when a succeeding page has the same copy-forgery-inhibited pattern, is described.

Figure 15:
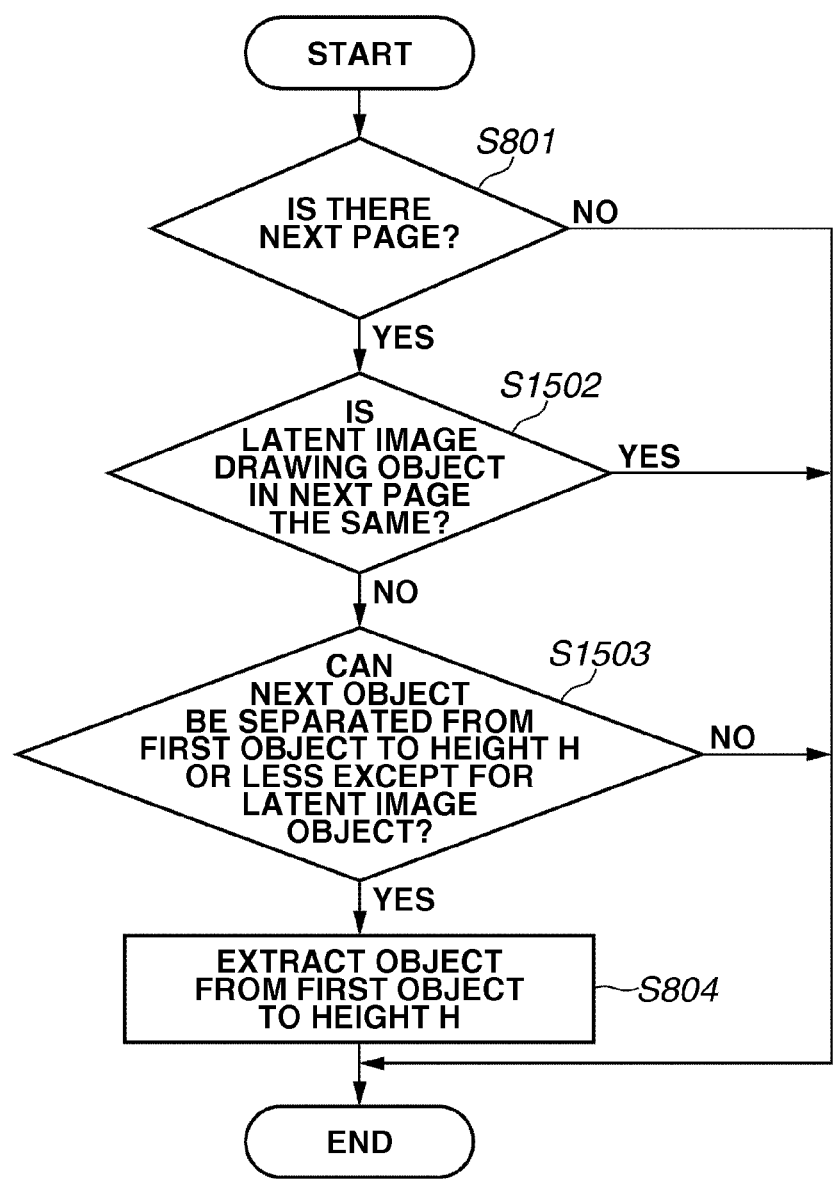
FIG. 15 is a flowchart illustrating the operation of the blank area searching unit.

A flowchart in FIG. 15 illustrates the operation of the overwrite drawing object searching unit 103 according to the third exemplary embodiment. In FIG. 15, the same reference numerals as those in the flowchart in FIG. 8 are applied to processing similar to the flowchart in FIG. 8.

In step S801, the overwrite drawing object searching unit 103 determines whether the next page to a page currently being processed exists within the document data notified in step S502 in FIG. 5.

In step S1502, the overwrite drawing object searching unit 103 determines whether the drawing object relating to the copy-forgery-inhibited pattern image in the next page is the same as that in the page currently being processed. The determination processing in step S1502 is performed using the identification information indicating contents of the drawing object in the drawing object attribute 222. In step S1502, it is determined that the second page that is the next page contains a copy-forgery-inhibited pattern background image and a latent image the same as those in the first page that is the page currently being processed. Accordingly, the overwrite drawing object searching unit 103 corresponds to a second determination unit.

In step S1503, the overwrite drawing object searching unit 103 determines whether it is possible to separate the drawing object in the next page to lay out in the blank area determined in the processing in FIG. 6. The processing performed in step S1503 is similar to that in step S802 except that the determination is made by excluding the drawing object relating to the copy-forgery-inhibited pattern image in the next page. Accordingly, a detailed description of the processing in step S1503 is omitted.

When it is determined that the drawing object can be separated in step S1503 (YES in step S1503), in step S804, the overwrite drawing object searching unit 103 extracts a drawing object laid out above the separable border.

Figure 14:
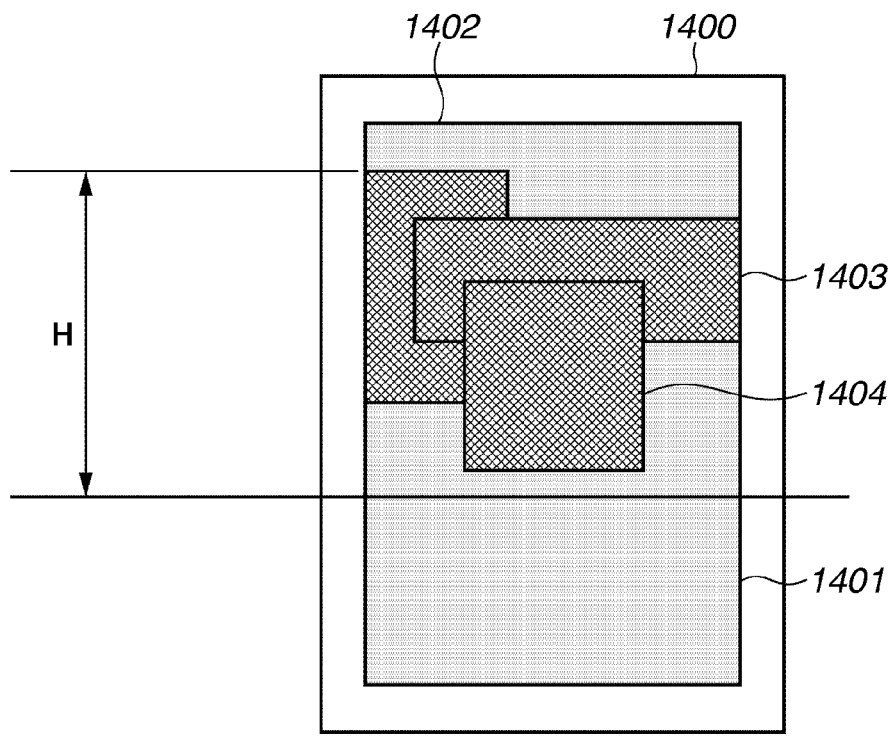
FIG. 14 illustrates operation of a blank area searching unit.
Figure 17:
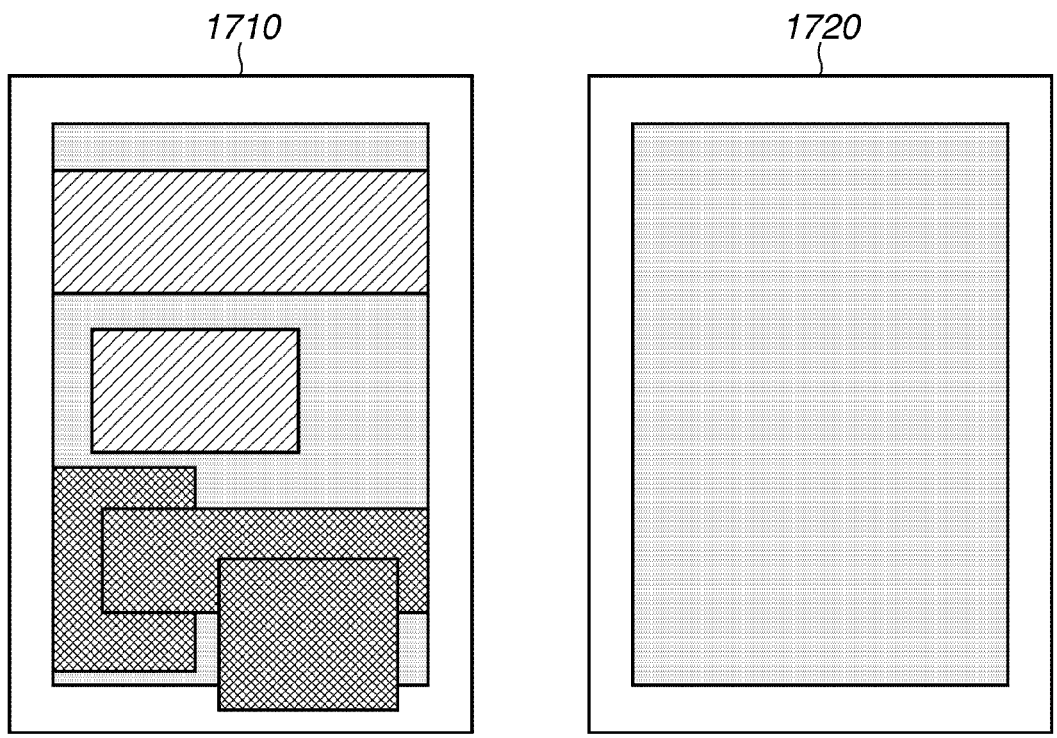
FIG. 17 illustrates an example of results of relayout according to the exemplary embodiment of the present invention.

By performing the above-described control, when the next page to the page 700 illustrated in FIG. 7 is a page 1400 illustrated in FIG. 14, it is possible to lay out the objects as illustrated as reference numeral 1710 in FIG. 17.

As illustrated as reference numeral 1720 in FIG. 17, by the overwrite drawing object searching unit 103, the drawing objects other than the drawing object relating to the copy-forgery-inhibited pattern image may be removed from the next page. It is not advisable to set such a page as the next target page. Accordingly, it is possible to perform control such that the page in which only the drawing object relating to the copy-forgery-inhibited pattern image exists is not read in step S1101 in FIG. 11.

In the third exemplary embodiment, when the succeeding page has the same copy-forgery-inhibited pattern, it is possible to move the drawing object in the succeeding page to the previous page. Accordingly, printing can be performed to save the number of sheets even if the data contains the copy-forgery-inhibited pattern.

As described in the above exemplary embodiments, when an output product obtained by printing page data containing a latent image overwritten by another drawing object is copied, the latent image may not appear on the copied product.

For example, in a case of a page 1900 in FIG. 19, when the print product on which the copy-forgery-inhibited pattern image containing the character-shaped latent image of "COPY" is laid out is copied, a latent image 1901 appears. However, when a page 1902 exists as the next page to the page 1900, if the above-described sheet reduction layout is applied, a relayout result like a page 1903 is obtained. When the print product is copied to obtain an output product 1904, the character-shaped latent image of "COPY" is hidden by the drawing object 1902 of the next page.

Figure 18:
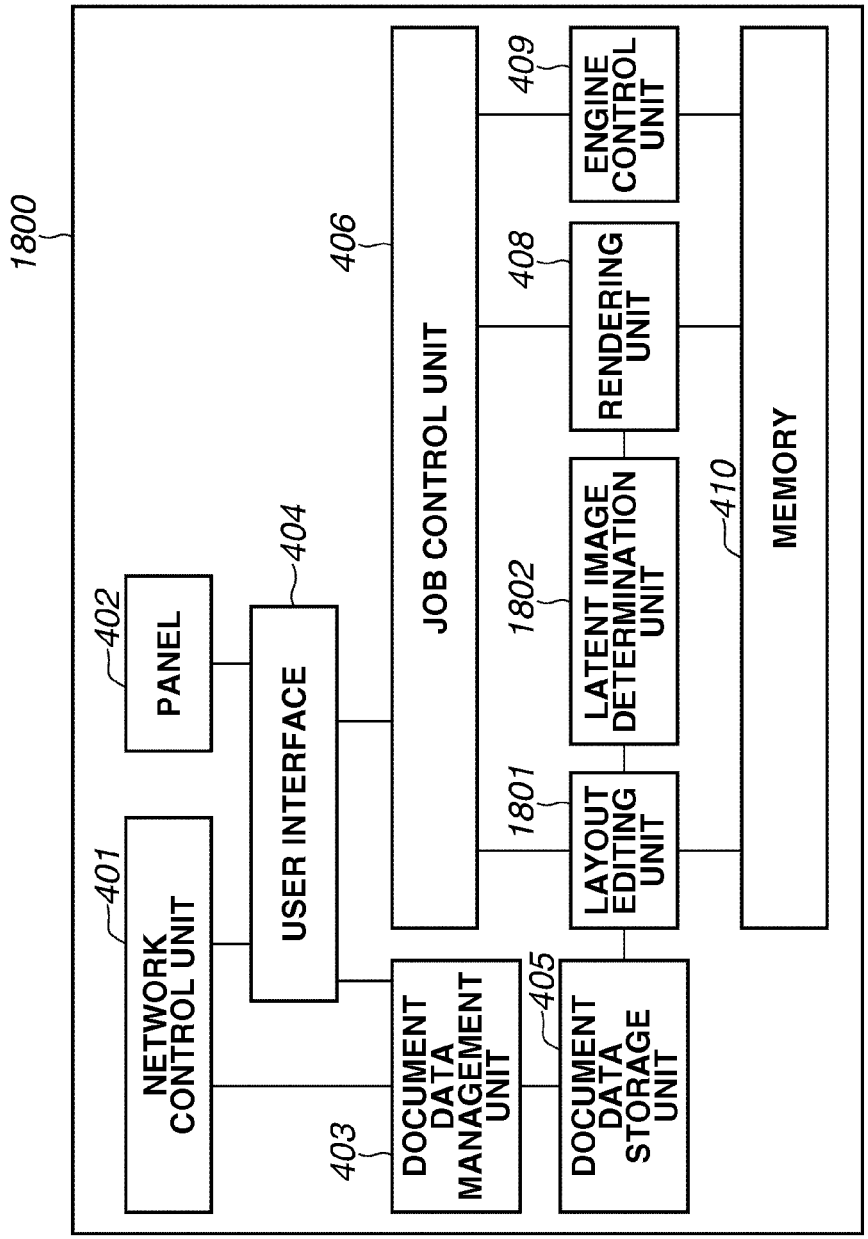
FIG. 18 illustrates an example of a print control system that performs layout processing according to an exemplary embodiment of the present invention.

FIG. 18 according to a fourth exemplary embodiment of the present invention is a block diagram illustrating a printer controller in a print control system configured to solve the above-described problem. To components that perform operation similar to that in FIG. 4, the same reference numerals as those in FIG. 4 are applied.

When a drawing object relating to the copy-forgery-inhibited pattern image exists in page data generated by changing the layout, a latent image determination unit 1802 determines whether a latent image appears by copying a print product obtained from the page data of the changed layout. When it is determined that the latent image does not appear, the change of the drawing object changed by the layout editing unit 1801 is returned to the original state.

Figure 20:
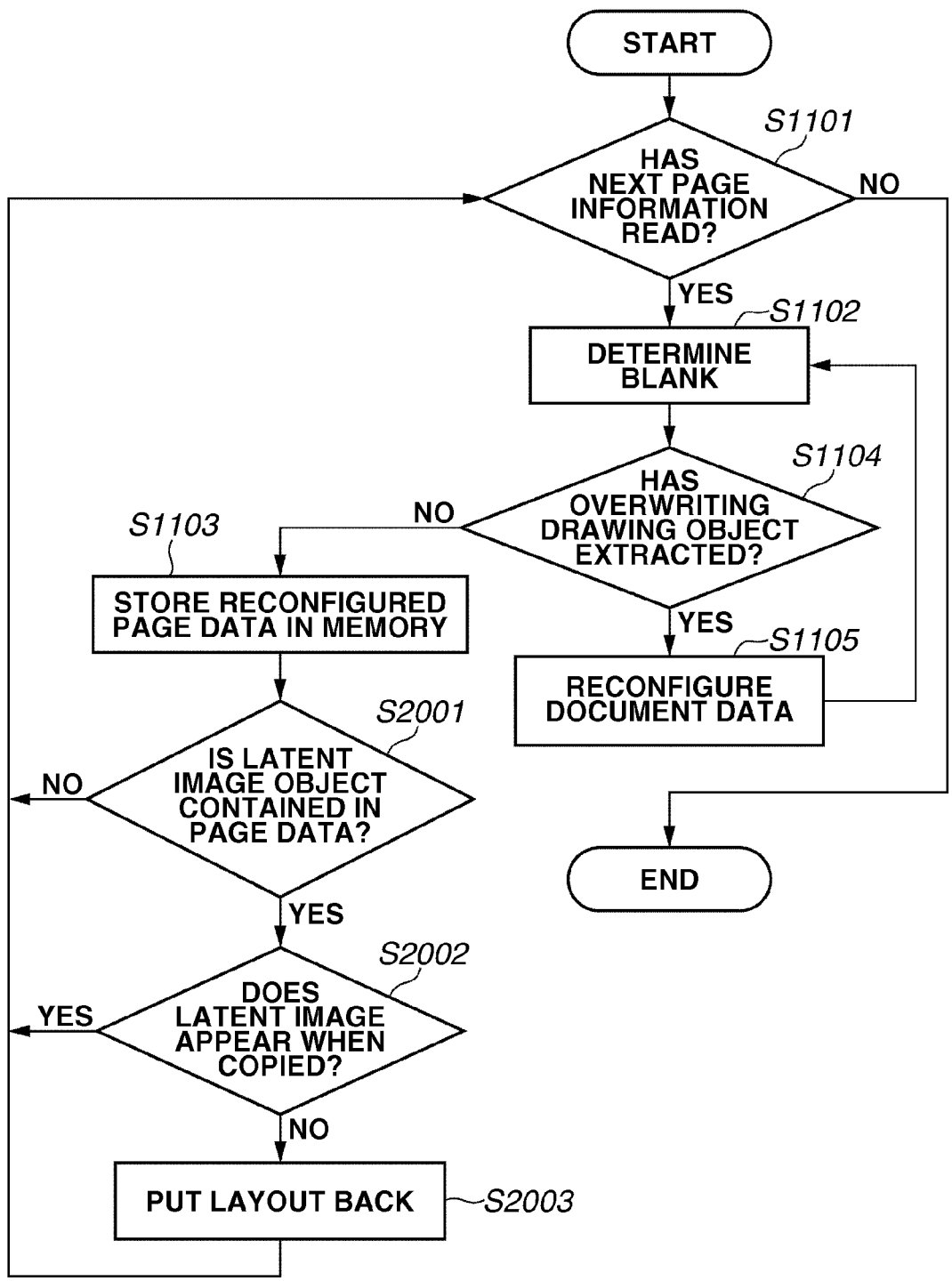
FIG. 20 is a flowchart illustrating operation of a layout editing unit.

Hereinafter, the processing performed in the layout editing unit 407 is described with reference to a flowchart in FIG. 20. In the flowchart in FIG. 20, the processing in steps S1101 to S1105 is similar to that in FIG. 11. Accordingly, its detailed description is omitted.

In step S1103, the layout editing unit 407 stores the page data in the memory 410. Then, in step S2001, the layout editing unit 407 checks whether the drawing object relating to the copy-forgery-inhibited pattern image is contained in the page data. An example of the determination processing in step S2001 is step S603 in FIG. 6. As the determination processing, the above-described method in the second exemplary embodiment may be used. When it is determined that the drawing object that appears as the latent image is not contained (NO in step S2001), the processing returns to step S1101.

In step S2001, when it is determined that the latent image is contained in the page data (YES in step S2001), in step S2002, the latent image determination unit 1802 determines whether the latent image appears when the print product obtained by printing the page data is copied. The processing performed in step S2002 is described below with reference to FIG. 22.

In step S2002, when it is determined that the latent image appears (YES in step S2002), the processing returns to step S1101. When it is determined that the latent image does not appear (NO in step S2002), in step S2003, the layout editing unit 407 returns the processing in step S1104 and step S1105 to the original state.

Figure 21:
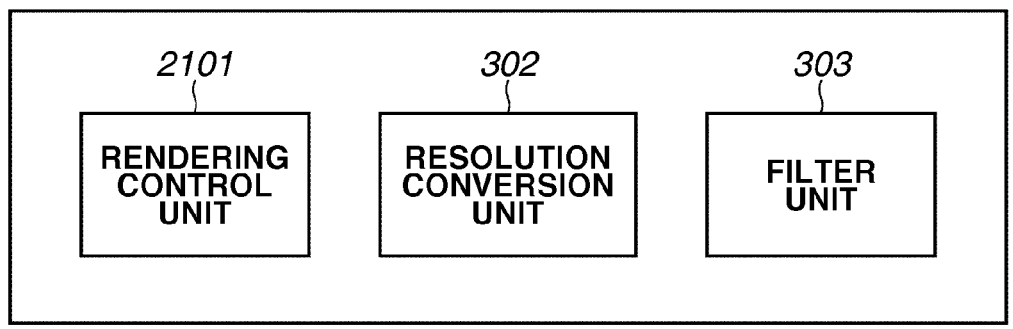
FIG. 21 is a block diagram illustrating an internal configuration of a latent image determination unit.
Figure 22:
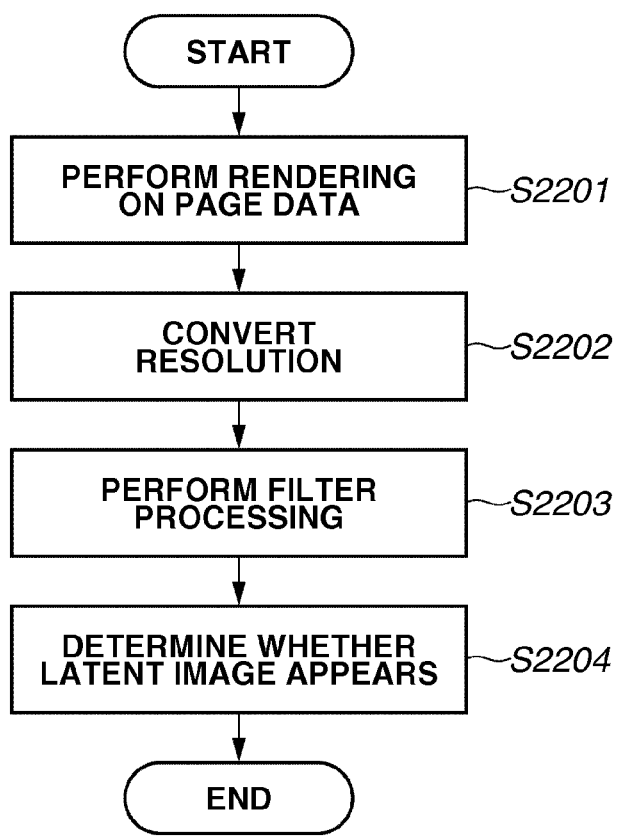
FIG. 22 is a flowchart illustrating the operation of the latent image determination unit.

The processing (S2002) performed by the latent image determination unit 1802 is described. FIG. 21 is a block diagram illustrating an internal configuration of the latent image determination unit. To components that perform operation similar to that in FIG. 4, the same reference numerals as those in FIG. 4 are applied. FIG. 22 illustrates a flowchart relating to the operation of the latent image determination unit.

In step S2201, a rendering control unit 2101 generates binary bitmaps from the page data specified in the layout editing unit 1801. For example, in FIG. 19, binary bitmaps of the page 1900 before the sheet reduction layout is performed and the page data 1903 on which the sheet reduction layout is performed are generated.

In step S2202, the resolution conversion unit 302 performs resolution conversion of the binary bitmaps generated in step S2201, and generates multivalued bitmaps.

In step S2203, the filter unit 303 generates a image using a low-pass filter on the multivalued bitmaps generated in step S2202.

In step S2204, the latent image determination unit 1802 compares the input image of the page before the sheet reduction layout is performed with the output image input in the filter unit 303, and specifies the latent image. Further, the latent image determination unit 1802 compares the output image of the page data on which the sheet reduction layout output by the filter unit 303 is performed, with the output image of the page before the sheet reduction layout is performed. In step S2204, using the comparison result, the latent image determination unit 1802 determines whether the latent image appears (remains).

More specifically, in FIG. 19, the characters of "COPY" are specified as the latent image from the page data 1901. By determining whether the latent image of "COPY" is output on the page data 1904 on which the sheet reduction layout is performed, the processing in step S2204 is performed.

As the other processing, an object attribute of the drawing object that is laid out in the previous page by the sheet reduction layout is analyzed, and whether the latent image is covered may be determined. More specifically, based on the object attribute of the drawing object 1902 in FIG. 19, the latent image determination unit 1802 specifies the size of a drawing object 1905, a solid fill area of the drawing object 1905, and the like. Then, the latent image determination unit 1802 determines whether the drawing position of "COPY" that is the latent image in the page 1901 overlaps with the drawing position of a drawing object 1905 that is laid out by performing the sheet reduction layout. When it is determined that the latent image and the drawing object 1905 overlap with each other and the solid fill area is specified to the drawing object 1905, the latent image determination unit 1802 may determine that the latent image does not appear after copying with the sheet reduction layout.

Figure 23:
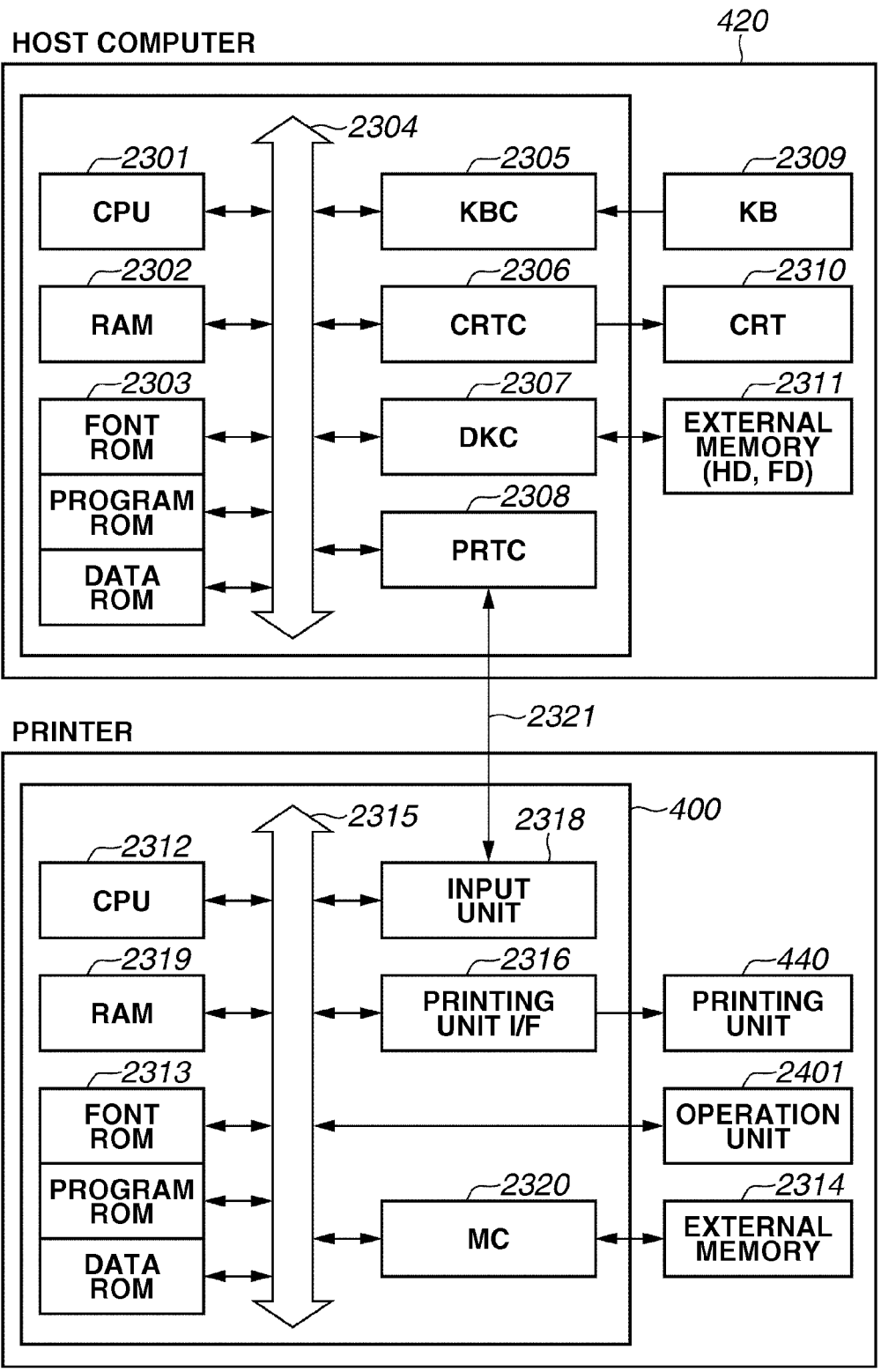
FIG. 23 illustrates a hardware configuration of a host computer and a printing apparatus according to an exemplary embodiment of the present invention.

FIG. 23 is a block diagram illustrating a configuration of a printer control system according to an exemplary embodiment of the present invention. As long as the functions according to the exemplary embodiments of the present invention can be performed, the present invention is applicable to a single apparatus, a system including a plurality of apparatuses, or a system connected via a network such as a local area network (LAN), a wide area network (WAN), or the like to perform the processing.

The host computer 420 includes a central processing unit (CPU) 2301 that performs processing of a document in which a figure, an image, a character, a table (including a spreadsheet), or the like are mixed, based on a document processing program or the like stored in a program read-only memory (ROM) of a ROM 2303 or an external memory 2311. The CPU 2301 performs control over each device connected to a system bus 2304. In the ROM 2303 or the external memory 2311, an operating system program (OS) that is a control program of the CPU 2301, or the like is stored. In a font ROM in the ROM 2303 or the external memory 2311, font data or the like used in the above-described document processing is stored. In a data ROM in the ROM 2303 or the external memory 2311, various data used in performing the above-described document processing is stored. A random access memory (RAM) 2302 functions as a main memory or work area of the CPU 2301, or the like.

A keyboard controller (KBC) 2305 controls key input from a keyboard 2309 or a pointing device (not shown). A cathode-ray tube (CRT) controller (CRTC) 2306 controls display of a CRT display (CRT). A disk controller (DKC) 2307 controls access to the external memory 2311 such as a hard disk (HD), floppy® disk (FD), or the like. The printer controller 400 is connected to the host computer 420 via a bidirectional interface (interface) 2321. It is desired to share a printer among a plurality of information processing apparatuses and when a LAN is configured, a plurality of printing apparatus may be used. Accordingly, it is advisable that the interface 2321 is a network such as Ethernet®.

The CPU 2301, for example, performs rasterization processing of an outline font on a display information RAM set on the RAM 2302, and enables WYSIWYG on the CRT 2310. Further, the CPU 2301 opens various windows registered according to commands instructed by a mouse cursor (not shown) or the like on the CRT 2310, and performs various data processing. When a user implements printing, the user can open a window relating to setting of the printing, make printer setting, and set a print processing method to a printer driver including selection of a print mode.

The printer controller 400 is controlled by a printer CPU 2312. The CPU 2312 outputs an image signal as output information to the printing unit (printer engine) 440 that is connected to a system bus 2315. The program ROM of the ROM 2313 stores a control program of the CPU 2312, or the like. The font ROM of the ROM 2313 stores font data or the like used when the above-described output information is generated. The data ROM of the ROM 2313 stores information or the like used on the host computer when a printer does not have the external memory 2314 such as a HD.

The CPU 2312 can perform communication with the host computer via an input unit 2318, and notify information within the printer or the like to the host computer 420. A RAM 2319 functions as a main memory or work area of the CPU 2312, or the like. A memory capacity of the RAM 2319 can be extended by an optional RAM connected to an extension port (not shown). The RAM 2319 is used as an output information rasterization area, an environmental data storage area, a non-volatile RAM (NVRAM), or the like. Access to the above-described external memory 2314 such as a HD, an integrated circuit card (IC card), or the like is controlled by a memory controller (MC) 2320. The external memory 2314 is connected as an option, and stores font data, an emulation program, form data, or the like. The input unit 2318 is the operation panel, on which a switch, a light-emitting diode (LED) display device, or the like for the above-described operation are provided.

The number of the above-described external memory 2314 is not limited to one, but a plurality of external memories may be connected and used. The plurality of external memories may store a program for interpreting embedded fonts, an optional card, printer control languages that have different language systems. Further, the external memory 2314 may be configured to include a NVRAM (not shown) to store printer mode setting information from an operation panel 2401.

According to the exemplary embodiments of the present invention, relayout of a drawing object can be performed on an area that can be substantially considered as a blank, so that printing can be performed while the number of sheets is saved.

The present invention can be applied to a system having a plurality of devices (for example, a host computer, an interface device, a reader, a printer, or the like) or an apparatus that consists of a single apparatus (for example, a copying machine, a facsimile machine, or the like). Further, the present invention can also be realized by providing a recording medium that records a program implementing the functions of the above-described exemplary embodiments to the system or the apparatus, and by reading and executing the program stored in the storage medium with a computer in the system or the apparatus. In such a case, the program itself, which is read from the storage medium, implements the functions of the exemplary embodiments mentioned above, and accordingly, the program itself and the storage medium storing the program constitute the present invention.

In addition, the functions according to the exemplary embodiments mentioned above may be implemented by an operating system (OS) running on the computer by performing a part of or the whole of the actual processing on the basis of the instruction given by the program. Further, the present invention can be applied to a case where the program read from the storage medium is written in a function expansion card inserted in the computer or a memory which is provided in a function expansion unit connected to the computer. In such a case, on the basis of the instruction given by the written program, a CPU and the like provided in the function expansion card or the function expansion unit carries out a part of or the whole of the processing to implement the functions of the exemplary embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application 2008-156899 filed Jun. 16, 2008, which is hereby incorporated by reference herein in its entirety.

What is claimed is:

1. An image forming apparatus that processes a page containing a copy-forgery-inhibited pattern image having a copy-forgery-inhibited pattern background image that is lost by copying a print product, and a latent image that remains after copying the print product:
   an instruction unit configured to issue an instruction to print a first page and a second page;
   a specification unit configured to specify as a blank area of the first page an area of the first page where a drawing object different from the copy-forgery-inhibited pattern background image and the latent image are not laid out and the copy-forgery-inhibited pattern background image and the latent image are laid out when the printing is instructed by the instruction unit;
   a search unit configured to search for a drawing object of the second page, which is placed in the blank area of the first page from the plurality of drawing objects in the second page; and
   a layout unit configured to lay out the drawing object of the second page that is searched for in the blank area of the first page.

2. The image forming apparatus according to claim 1, the image forming apparatus further comprising:
   a first determination unit configured to determine whether the drawing object of the second page can be laid out in the blank area,
   wherein the layout unit lays out the drawing object of the second page determined by the first determination unit to be able to be laid out, in the blank area of the first page.

3. The image forming apparatus according to claim 1, the image forming apparatus further comprising:
   a second determination unit configured to determine whether the second page contains the same copy-forgery-inhibited pattern background image and the latent image as the first page,
   wherein when the second determination unit determines that the second page does not contain the same copy-forgery-inhibited pattern background image and the latent image as the first page, the layout unit does not lay out the drawing object of the second page in the blank area of the first page, and when the second determination unit determines that the second page contains the same copy-forgery-inhibited pattern background image and the latent image as the first page, the layout unit lays out the drawing object of the second page in the blank area of the first page.

4. The image forming apparatus according to claim 1, wherein when the instruction unit issues an instruction to perform printing that reduces the number of sheets, the specification unit specifies as the blank area the area where the drawing object different from the latent image and the copy-forgery-inhibited pattern background image is removed from the copy-forgery-inhibited pattern image in the first page.

5. A control method of an image forming apparatus that processes a page containing a copy-forgery-inhibited pattern image having a copy-forgery-inhibited pattern background image that is lost by copying a print product, and a latent image that remains after copying the print product, the control method comprising:
   issuing an instruction to print a first page and a second page;
   specifying as a blank area of the first page an area of the first page where a drawing object different from the copy-forgery-inhibited pattern background image and the latent image are not laid out and the copy-forgery-inhibited pattern background image and the latent image are laid out when the printing is instructed;
   searching for a drawing object of the second page, which is placed in the blank area of the first page from the plurality of drawing objects in the second page; and
   laying out the drawing object of the second page that is searched for in the blank area of the first page.

6. The control method according to claim 5, the control method further comprising:
   determining whether the drawing object of the second page can be laid out in the blank area, and
   laying out the drawing object of the second page determined to be able to be laid out, in the blank area of the first page.

7. The control method according to claim 5, the control method further comprising:
   determining whether the second page contains the same copy-forgery-inhibited pattern background image and the latent image as the first page, and
   not laying out the drawing object of the second page in the blank area of the first page when it is determined that the second page does not contain the same copy-forgery-inhibited pattern background image and the latent image as the first page, and laying out the drawing object of the second page in the blank area of the first page when it is determined that the second page contains the same copy-forgery-inhibited pattern background image and the latent image as the first page.

8. The control method according to claim 5, the control method further comprising:
   specifying as the blank area the area where the drawing object different from the latent image and the copy-forgery-inhibited pattern background image is removed from the copy-forgery-inhibited pattern image in the first page when printing that reduces the number of sheets is instructed.

9. A non transitory computer readable medium containing a program for implementing a control method of an image forming apparatus that processes a page containing a copy-forgery-inhibited pattern image having a copy-forgery-inhibited pattern background image that is lost by copying a print product, and a latent image that remains after copying the print product, the control method comprising:
   issuing an instruction to print a first page and a second page;
   specifying as a blank area of the first page an area of the first page where a drawing object different from the copy-forgery-inhibited pattern background image and the latent image are not laid out and the copy-forgery-inhibited pattern background image and the latent image are laid out when the printing is instructed;
   searching for a drawing object of the second page, which is placed in the blank area of the first page from the plurality of drawing objects in the second page; and
   laying out the drawing object of the second page that is searched for in the blank area of the first page.

10. The non-transitory computer readable medium according to claim 9, the control method further comprising:

determining whether the drawing object of the second page can be laid out in the blank area, and laying out the drawing object of the second page determined to be able to be laid out, in the blank area of the first page.

11. The non-transitory computer readable medium according to claim 9, the control method further comprising:

determining whether the second page contains the same copy-forgery-inhibited pattern background image and the latent image as the first page, and not laying out the drawing object of the second page in the blank area of the first page when it is determined that the second page does not contain the same copy-forgery-inhibited pattern background image and the latent image as the first page, and laying out the drawing object of the second page in the blank area of the first page when it is determined that the second page contains the same copy-forgery-inhibited pattern background image and the latent image as the first page.

12. The non-transitory computer readable medium according to claim 9, the control method further comprising:

specifying as the blank area the area where the drawing object different from the latent image and the copy-forgery-inhibited pattern background image is removed from the copy-forgery-inhibited pattern image in the first page when printing that reduces the number of sheets is instructed.

\* \* \* \* \*